United States Patent [19]

Streeter et al.

[11] 4,027,099
[45] May 31, 1977

[54] REDUCING TELEPRINTER ERRORS CAUSED BY PRIMARY POWER FREQUENCY VARIATIONS

[75] Inventors: Robert D. Streeter, Fort Wayne; John G. Mohr, Woodburn, both of Ind.

[73] Assignee: The Magnavox Company, Fort Wayne, Ind.

[22] Filed: Mar. 8, 1976

[21] Appl. No.: 664,598

[52] U.S. Cl. .............................. 178/23 R; 178/69.1; 360/51
[51] Int. Cl.² .......................................... G11B 5/44
[58] Field of Search .......... 178/69.5 F, 23 R, 23 A, 178/DIG. 24; 360/26, 27, 51; 307/269, 262

[56] References Cited
UNITED STATES PATENTS

| 3,403,222 | 9/1968 | Bishop | 178/69.5 F |
|---|---|---|---|
| 3,577,132 | 5/1971 | Anderson et al. | 360/51 |

OTHER PUBLICATIONS

Knott et al.: *Mains Rejection Tracking Filter*, Wireless World, Oct. 1974, pp. 375–379.

*Primary Examiner*—Thomas A. Robinson
*Attorney, Agent, or Firm*—Thomas A. Briody; Frank R. Trifari; George Pettit

[57] ABSTRACT

A voltage controlled frequency source has an output frequency which varies in accordance with primary power line frequency variations. The output frequency of the voltage control frequency source is used to control the rate at which data is fed into a teleprinter machine thereby providing the teleprinter with data at a rate that can be varied in accordance with power line frequency variations. A method of modifying input data rate into a teleprinter machine in accordance with frequency variations of the primary power line frequency is also provided.

17 Claims, 4 Drawing Figures

REDUCING TELEPRINTER ERRORS CAUSED BY PRIMARY POWER FREQUENCY VARIATIONS

BACKGROUND OF THE INVENTION

This invention relates to apparatus and method for varying the input rate of data into a system in accordance with primary power line frequency variations. More particularly, the present invention relates to apparatus and method for reducing teleprinter printing errors that are due to primary power line frequency variations.

Operation of a teleprinter machine without readout or printing errors, caused by primary power frequency variations, requires that the primary power line frequency be maintained constant within certain defined limits determined by machine design and specified by the machine manufacturer. The typical requirements specified by one teleprinter machine manufacturer is a primary power line frequency of 50Hz or else 60Hz with a tolerance of plus or minus 0.45Hz. Such line frequency control is primarily necessary in order that the rotational speed of the teleprinter drive motor remain within a predetermined synchronized relationship with the data rate input to the teleprinter machine. In the normal teleprinter applications, the primary power supplied to the machine is generally obtained from commercial electric power station sources and as such is maintained within the relatively close frequency tolerances. Operation of the teleprinter machine under these conditions is therefore generally satisfactory. Some teleprinter machines are manufactured with governor controlled drive motors. These machines are more tolerant to primary power line variations of both frequency and voltage.

There is, however, an ever increasing application of teleprinter machines in operational environments where commercial electric primary power is not available and where the machines must operate from locally generated primary power. One such application is aboard ocean going ships. In many of these applications even governor controlled machines prove to be either unsatifactory in operation or pose a potential reliability problem. In remote locations where teleprinter machines are operated from locally generated primary power which is not or cannot be closely frequency regulated, printing errors result. Many times the cause of these printing errors is not known and much time and effort is expended in trying to track down the source of the errors. And of course, if the locally generated primary power commences to operate at a frequency that falls within the manufacturers specifications, the problem disappears and the cause of the printing errors is not found.

In the past, in certain applications the data rate into a system was controlled as a function of the rotational speed of the teleprinter drive motor by using electrooptic sensors to sense drive motor speed. Although this electrooptic system tends to compensate for any condition which could cause the rotational speed of the drive motor to change, it requires special modification of the teleprinter machine to incorporate the electrooptical speed sensors. This, of course, requires that a special machine be supplied by the manufacturer or that the teleprinter machine be modified either by the communications system supplier or the user.

In view of the foregoing, it should now be understood that it would be desirable to provide an improved system that would solve the above and the other problems.

Accordingly, one of the objects of the present invention is to provide a control system which is all electronic in operation and does not require modification to existing available teleprinter machines.

Another object of the invention is to provide a control system wherein the frequency of the primary power line is continuously monitored and the rate at which data is supplied to the teleprinter machine is variably controlled as a function of the frequency of the monitored primary power line.

Yet another object of the present invention is to provide a method of modifying the data rate supplied to a system as a function of the frequency of the primary power to the system in a simple and reliable manner that has the versatility of being usable with many different machines.

SUMMARY OF THE INVENTION

In carrying out the above and other objects of the invention in one form, we provide an improved method and apparatus for reducing data errors in a system that are caused by primary power line frequency variations. A voltage controlled frequency generator is used to generate a frequency that varies in accordance with primary power line frequency variations. The output of the voltage controlled frequency generator is used to clock data into an apparatus, so that the apparatus receives input data at a rate that can be modified in accordance with primary power line frequency variations.

A method is also provided for monitoring primary power line frequency. A voltage controlled frequency generator is controlled in accordance with variations of the primary power line frequency thereby providing an output frequency from the voltage control oscillator that varies in accordance with primary power line frequency variations. Data is clocked into an apparatus at a rate that is controlled by the output frequency of the voltage controlled oscillator.

The subject matter which we regard as our invention is set forth in the appended claims. The invention itself, however, together with further objects and advantages thereof, may be better understood by referring to the following detailed description taken in conjunction with the accompanying drawings.

The exemplifications set out herein illustrate the preferred embodiment of the invention in one form thereof, and such exemplifications are not to be construed as limiting in any manner.

DESCRIPTION OF THE PREFERRED EMBODIMENTS

A method of modifying the rate at which data is supplied to a teleprinter as a function of frequency of primary power, thereby minimizing printer errors due to power line frequency variations, is provided. The primary power is monitored and a signal is developed corresponding to any variations in frequency that occur. This signal is used to control the output frequency of a voltage controlled oscillator which can be part of a phase lock loop or can be a blocking oscillator. The output of the voltage controlled oscillator can be divided down to provide a clocking frequency that is compatible with the baud rate of the particular teleprinter machine being used. If it is not necessary to divide down the output frequency of the voltage controlled oscillator, then the output divide circuitry can be eliminated or else must be set to divide by one. The divided output is used to clock data from a temporary storage into the teleprinter machine thereby clocking data into the teleprinter machine at a rate that can be modified in accordance with any frequency variations of the primary power frequency.

Figure 1:
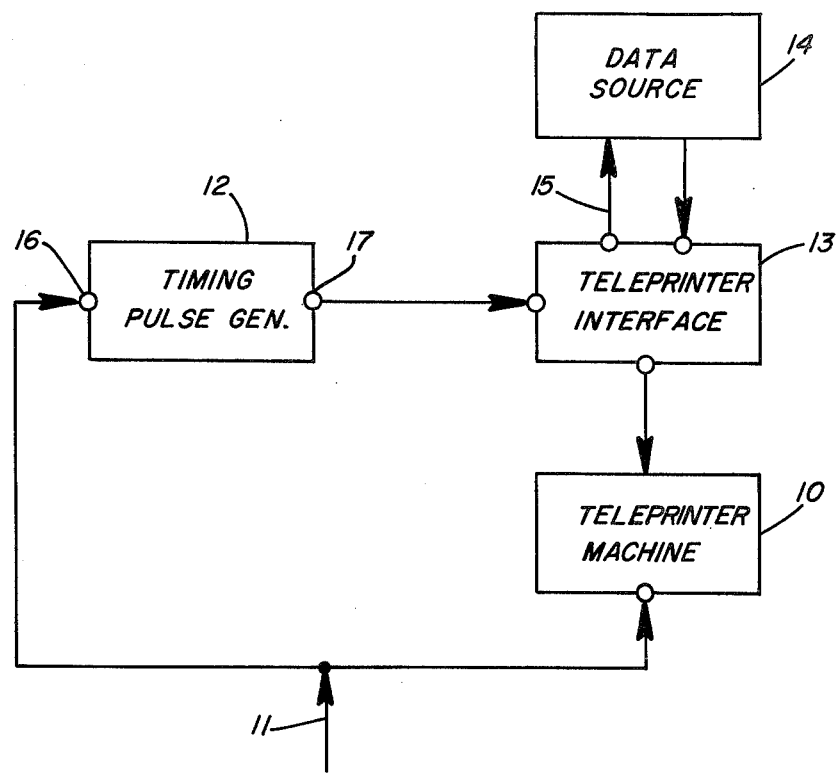
FIG. 1 is a block diagram illustrating one embodiment of the invention.

Referring now to FIG. 1, teleprinter machine 10 is powered by primary input power received on line 11. The primary input power coming in on line 11 also goes to terminal 16 which is an input terminal for timing pulse generator 12. Timing pulse generator 12 generates timing pulses which vary in frequency in accordance with frequency variations of the primary input power and these pulses appear on output terminal 17 and are connected to teleprinter interface 13. Teleprinter interface 13 receives data from data source 14 and temporarily stores the data from data source 14 so that the data may be clocked into teleprinter machine 10 by the output signal from timing pulse generator 12. When the data in teleprinter interface 13 has been clocked to the teleprinter machine 10, a request is sent on line 15 to data source 14 for additional data. Data source 14 can be a mini-computer or any other device which receives, handles, and/or stores data for teleprinter machine 10. The teleprinter machine may be any conventional teleprinter such as, for example, a model 32 manufactured by the Teletype Corporation. The timing pulse generator 12 senses the frequency of the alternating current primary power received on line 11 and produces an output signal of variable clock pulses to the teleprinter interface 13. The rotational speed of the teleprinter drive motor is, of course, also a function of the alternating current primary line frequency. It should now be apparent that any change in the frquency of the primary power supplied to the teleprinter machine causing a change in the rotational speed of the teleprinter machine drive motor will also cause a corresponding change in the rate at which the data signal is supplied to the teleprinter machine for printout. Thus, as the primary power line frequency varies, the data rate supplied to teleprinter 10 is also varied so as to maintain a predetermined and desired synchronism between the teleprinter drive motor speed and the rate at which the data is supplied to the teleprinter machine 10 for printout.

Figure 2:
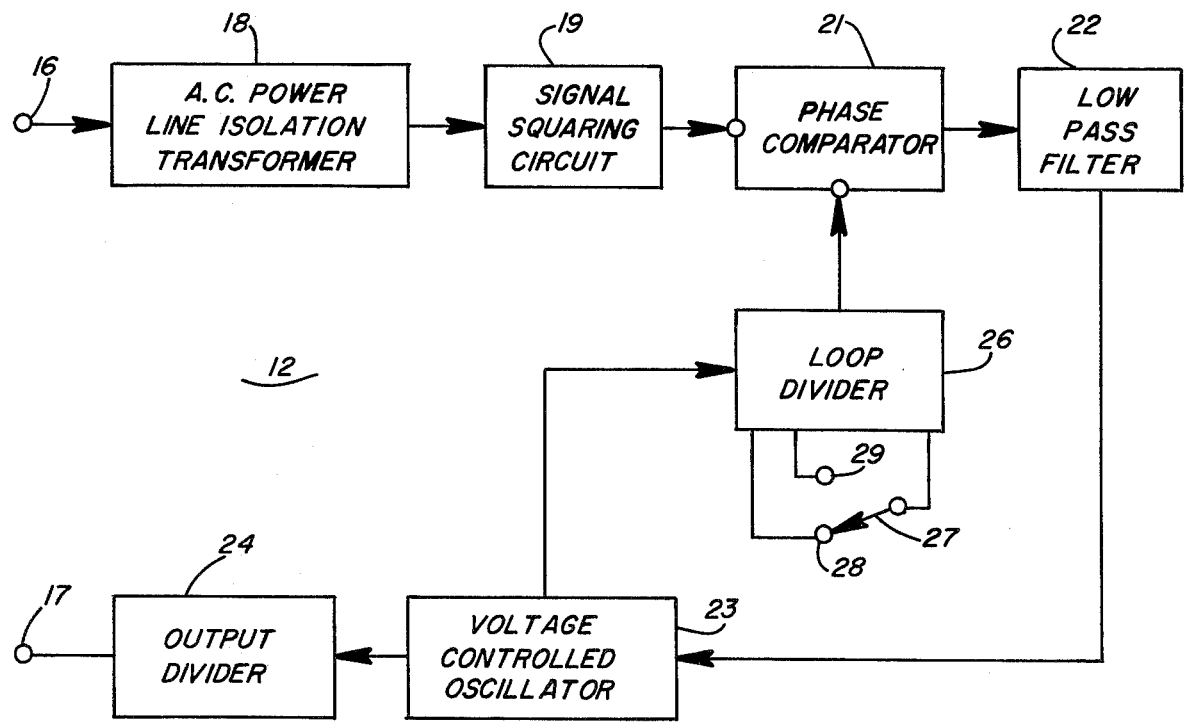
FIG. 2 is a detail block diagram of an embodiment that could be used for the timing pulse generator shown in FIG. 1.

Referring now to FIG. 2, there is illustrated a detailed block diagram of timing pulse generator 12 shown in FIG. 1. The primary input power that is monitored comes into the circuit on terminal 16 and is connected to an isolation transformer 18 which is used to eliminate any direct connection of the rest of the circuit to the primary power line. In some applications of the invention, the isolation transformer 18 could be eliminated if desired. The isolation transformer 18 may, of course, have any desired step up or step down ratio to provide any desired signal level into signal squaring circuit 19. Squaring circuit 19 operates on its input signal from the isolation transformer 18 to provide a squared, clipped, or pulse signal at its output which has a frequency characteristic of the input signal. Squaring circuit 19 can be one of any number of circuits well known in the art to clip or square the peaks of the signal applied to its input. A digital phase locked loop comprised of phase comparator 21, low pass filter 22, and voltage controlled oscillator 23 with a loop divider 26 operates to provide a predetermined output signal which is locked in phase relationship with the primary power line frequency. Loop divider 26 has a two position switch 27 which is used to select the proper divider for loop 26 depending upon the frequency of the primary input power. As for example, when switch 27 is set to make contact with terminal 28 the input power may have a nominal frequency of 60Hz while when switch contact 27 is set to make contact with terminal 29 the input power frequency may be nominally 50Hz. Thus, switch 27 allows the use of timing pulse generator 12 with either a 60Hz 50Hz alternating current primary power line frequency source. The output frequency appearing at terminal 17 will depend upon the data baud rate of the teleprinter system being used. Accordingly, the divide ratio of output divider 24 must be selected to provide the proper frequency at terminal 17.

The following table will illustrate examples of nominal voltage controlled oscillator (V.C.O.) frequencies and the respective division ratios for other usable teleprinter band rates in primary power line frequencies. The numbers used in the table are selected to provide optimum characteristics for both 50Hz and 60Hz system operation. Other multiples of the voltage controlled oscillator 23 and divide ratios for dividers 24 and 26 are obviously usable as long as the required output can still be obtained.

| NOMINAL TELE- PRINTER SYSTEM BAUD RATE (PER SEC) | NOM- INAL POWER LINE FREQ. (Hz) | NOM- INAL OUTPUT CLOCK FREQ. AT TERMIN- AL 17 (Hz) | NOM- INAL V.C.O. 23 OUTPUT FREQ. (Hz) | OUTPUT DIVIDER 24 (DIVIDE RATIO) | P.L. LOOP DIVIDER 26 (DIVIDE RATIO) |
| --- | --- | --- | --- | --- | --- |
| 50 | 60 | 800 | 2400 | 3 | 40 |
| 50 | 50 | 800 | 2400 | 3 | 48 |
| 75 | 60 | 1200 | 1200 | 1 | 20 |
| 75 | 50 | 1200 | 1200 | 1 | 24 |
| 45 | 60 | 720 | 3600 | 5 | 60 |
| 45 | 50 | 720 | 3600 | 5 | 72 |
| 56.25 | 60 | 900 | 900 | 1 | 15 |
| 56.25 | 50 | 900 | 900 | 1 | 18 |

It should now be apparent that the signal appearing at terminal 17 will be of a predetermined frequency locked in phase with, and dependent upon, the frequency of the alternating current primary line voltage. Thus, as the primary power line frequency varies from its nominal value, the clock signal at the output terminal 17 will also vary in a predetermined synchronized relationship with the primary power line frequency variations. As an example, if we were operating a system that has a nominal baud rate of 50 per second operating on a power line frequency of 60Hz the nominal frequency at terminal 17 would be 800Hz. However, if the power line frequency varies by decreasing from a nominal 60Hz to 57Hz then the frequency at the output terminal 17 will decrease to 760Hz since the phase lock loop multiplies a 60Hz input by 40 and output divider 24 divides by 3. The operation of the phase lock loop shown in FIG. 2 is conventional and well known and further description is unnecessary. However, it should be understood that the timing pulse generator illustrated in block diagram form of FIG. 2 can be either analog or digital as desired and compatible with the requirements of the teleprinter system including data and interface requirements.

Figure 3:
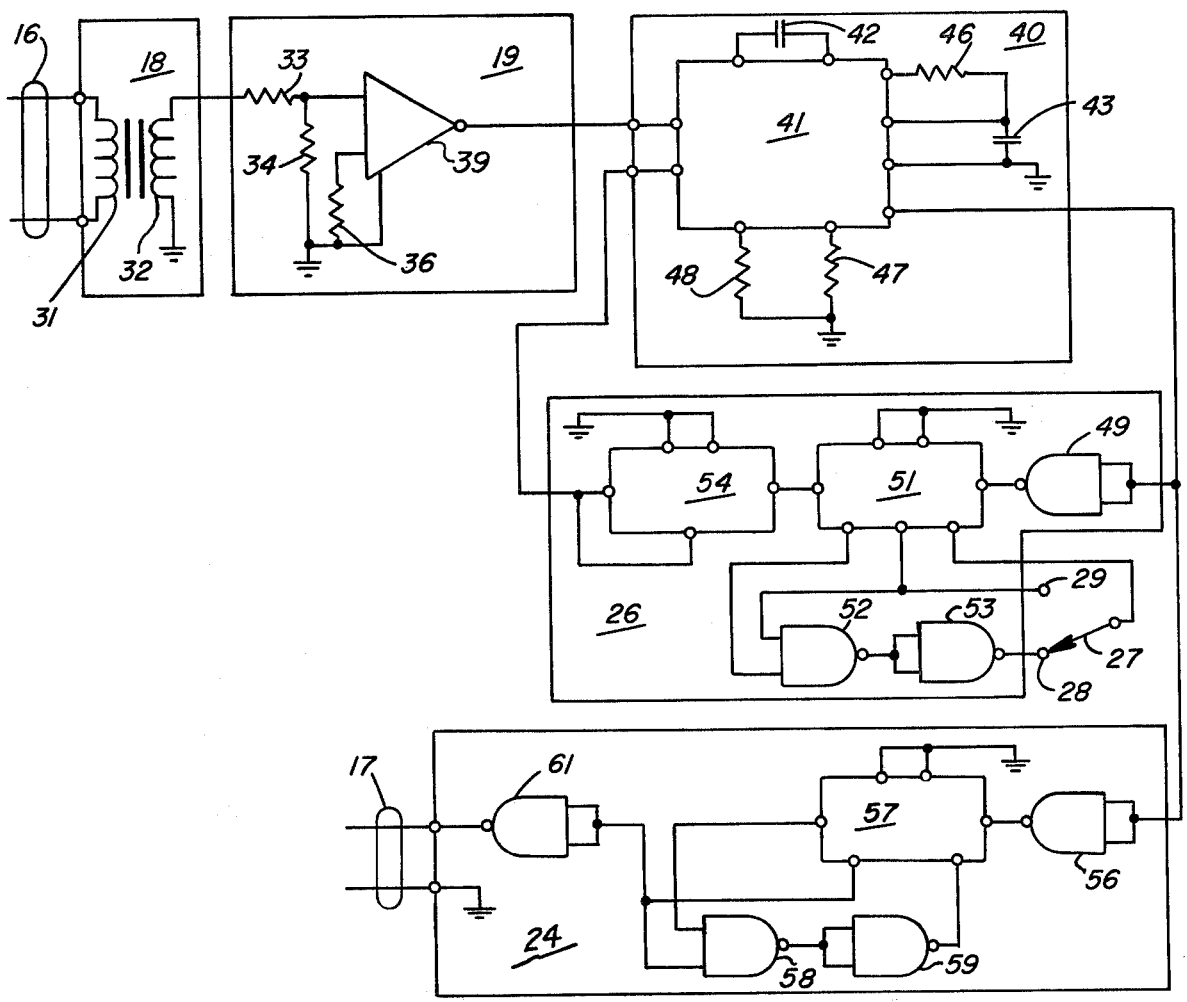
FIG. 3 is a schematic diagram of the block diagram illustrated in FIG. 2.

Referring now to FIG. 3, there is shown in schematic form circuitry to perform the function of the blocks of FIG. 2. The same reference numbers are used in FIG. 3 as in FIG. 2 for common elements. The primary input power to be monitored comes into primary winding 31 of isolation transformer 18 and is coupled to secondary winding 32 of the transformer. The output of isolation transformer 18 goes to a voltage divider formed by resistors 33 and 34 and then into voltage comparator 39. A second input of voltage comparator 39 is returned to ground through resistor 36. It will be obvious that all integrated circuitry is connected to power supply sources as required. Voltage comparator 39 and its associated resistors and capacitors form signal squaring circuit 19. Many other combinations of components are possible to perform the function of signal squaring circuit 19, e.g., something as simple as a resistor and appropriate diode clippers could be used.

The output from signal squaring circuit 19 goes to one of the inputs of circuit 40. Circuit 40 includes an integrated circuit 41 and capacitors 42 and 43 and resistors 46, 47, and 48. Circuit 40 performs the functions described hereinbefore for phase comparator 21, low pass filter 22, and voltage control oscillator 23 of FIG. 2. The output from circuit 40 goes to loop divider 26 and also to output divider 24. Circuit 40 output is received at loop divider 26 by a buffer inverter 49 which passes the signal to divider 51 which is cascaded with divider 54. Divider 51 is connected to logic gate 52 which is connected to buffer inverter 53. Switch 27 is shown connected to the output of buffer inverter 53 and to an input of divider 51. Logic gate 52 performs the function of combining two different intermediate outputs from divider 51 which can then be used by divider 51 to provide a required divide ratio. Switch 27 can be switched to make contact with terminal 29 thereby providing only one of the intermediate outputs to divider 51. The output from divider 54 is fed back to circuit 41 for loop frequency control. Output divider 24 receives the output from circuit 40 through buffer inverter 56 which passes the signal to divider 57. Divider 57 is connected to logic gate 58 and buffer inverter 59 to provide the desired divide ratio for output divider 24. The output from divider 57 goes to output terminal 17 through buffer inverter 61. Buffer 61 serves as a buffer and driver to circuitry connected to output terminal 17. In those cases where the output from circuit 40 is of the proper frequency, then output divider 24 need only divide by one or as a practical matter output divider 24 could be eliminated altogether or perhaps replaced by a buffer driver.

The circuitry illustrated in FIG. 3 can be built using readily available integrated circuits. However, it will be understood by those skilled in the art that the functions required to be performed by the circuitry of FIG. 3 could be achieved by other components than those illustrated or those listed hereinafter. The circuitry illustrated in FIG. 3 was built and satisfactorily used with the components listed below:

| Item | Component Used |
| --- | --- |
| 39 | Voltage Comparator 710 |
| 41 | Phase Lock Loop, RCA CD4046 |
| 49 | NAND Gate, RCA CD4011 |
| 51 | Divider Counter, RCA CD4018 |
| 52 | NAND Gate, RCA CD4011 |
| 53 | NAND Gate, RCA CD4011 |
| 54 | Divider Counter, RCA CD4018 |
| 56 | NAND Gate, RCA CD4011 |
| 57 | Divider Counter, RCA CD4018 |
| 58 | NAND Gate, RCA CD4011 |
| 59 | NAND Gate, RCA CD4011 |
| 61 | NAND Gate, RCA CD4011 |

Figure 4:
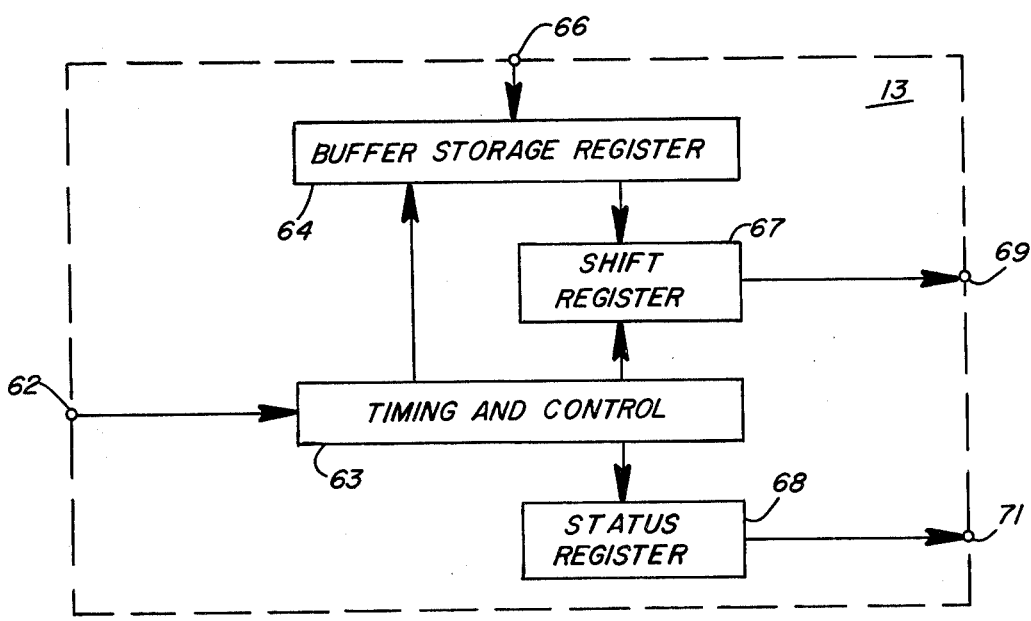
FIG. 4 is a detail block diagram of one embodiment of the teleprinter interface of FIG. 1.

FIG. 4 illustrates in block diagram from the functions performed by teleprinter interface 13 of FIG. 1. Input data is received at terminal 66 for buffer storage register 64 which among other things serves as a temporary storage for the input data. The input is normally received in a parallel bit format and can contain control information for the teleprinter machine along with word or character information to enable the teleprinter to print the desired message. The data remains in storage 64 until timing and control circuitry 63 clocks the data but out of storage 64 into shift register 67. Timing and control 63 clocks the data out of storage 64 in time with the frequency of the signal received at terminal 62. Terminal 62 receives the signal from terminal 17 of FIG. 3. The data in shift register 67 is sent to the teleprinter machine through output terminal 69. The data at terminal 69 appears in serial format for use by the teleprinter although the data was in parallel format at input terminal 66. The frequency of the signal on terminal 62 controls the rate or speed at which data is serially applied to output terminal 69. Status register 68 sends a signal through terminal 71 to the data source that is connected to input terminal 66 to supply data to temporary storage 64 when storage 64 is ready to receive additional input data. The functions performed by the blocks illustrated in FIG. 4 were performed in one circuit that was built as a large scale MOS integrated circuit manufactured by SMC Microsystems Corporation and identified as a COM 2017H (UART), universal asynchronous receiver-transmitter which is a complete serial to parallel and parallel to serial interface circuit.

It will now be appreciated that we have provided an improved method of reducing printing errors in a teleprinter system. Our invention eliminates the need of any special teleprinter speed control within the teleprinter machine itself, such as for example, the previously mentioned governor control and its associated disadvantages. In addition, a greater range of primary power line frequency variations can be tolerated without resulting in printout errors. This invention allows the use of a standard teleprinter machine as received from the teleprinter manufacturer without extensive modification to the internal mechanism or to its housing. This invention utilizes commercially available integrated circuits which have a high reliability and low consumption of power. The invention is readily adaptable for use with various machines having different printer speeds and operating off of various different primary power line frequencies.

Consequently, while in accordance with the Patent Statutes, we have described that at present are considered to be the preferred forms of our invention it will be obvious to those skilled in the art that numerous changes and modifications may be made herein without departing from the spirit and scope of the invention, and it is therefore aimed that the following claims cover all such modifications.

What we claim as new and desire to secure by Letters Patent of the United States is:

1. A system for modifying the rate at which data is supplied to a teleprinter machine operating at a speed as determined by the frequency of alternating current primary input power to the teleprinter machine, comprising: a signal squaring circuit to provide an output signal corresponding in frequency and phase to the alternating current primary input power; a phase comparator to compare the output signal from the signal squaring circuit with a second signal; a voltage controlled oscillator to provide an output frequency that is controllable by an output from the phase comparator; a loop divider to divide the output frequency from the voltage controlled oscillator and thereby generate the second signal for use by the phase comparator; an output divider to divide the output frequency from the voltage controlled oscillator down to a frequency suitable for clocking input data into the teleprinter machine, the output divider providing an output that varies as a function of the frequency of the alternating primary input power, and means responsive to said divider output for controlling the rate at which data is supplied to said teleprinter machine.

2. The system of claim 1 further including a storage register to store teletypewriter input data until clocked out at a rate controlled by the output of the output divider.

3. The system of claim 1 further including means to couple the alternating current primary input power to the signal squaring circuit.

4. A system for varying the input rate of data into an apparatus as a function of variations of frequency of input power to the apparatus, comprising: a signal squaring circuit to produce pulses from an alternating power source, the pulses corresponding in time and phase relationship to the alternating power source; a phase comparator having a first input, a second input and an output, the pulses produced by the signal squaring circuit being fed into the first input; a voltage controlled oscillator receiving the output from the phase comparator and producing an output frequency which can be controlled by the output from the phase comparator; a loop divider to divide the output frequency from the voltage controlled oscillator and to supply the divided frequency to the second input of the phase comparator; and an output divider to divide the output frequency from the voltage oscillator and to provide an output frequency for use in an interface unit, which interface unit passes input data to the apparatus at a rate controlled by the output frequency from the output divider.

5. The system of claim 4 wherein the interface unit comprises a buffer storage register to store input data, and timing means to clock data out of the buffer storage register at a rate controlled by the output frequency from the output divider.

6. A system to variably control the data input rate into an apparatus in accordance with frequency variations that may occur in primary power supplied to the apparatus, comprising: means to provide a signal corresponding in frequency and phase to the primary power; means to compare the signal corresponding in frequency and phase to the primary power and a second signal; an oscillator having an output frequency that can be varied in response to an output signal from the means to compare; first means to divide the output frequency from the oscillator to provide the second signal for use by means to compare; and second means to divide the output frequency from the oscillator to provide a signal that can be used to clock input data into the apparatus at a rate that will vary as the frequency of the primary power varies.

7. The system of claim 6 further including means to temporarily store input data for the apparatus so that the input data may be closed into the apparatus in response to the signal from the second means to divide.

8. An improved teleprinter having a signal actuated mechanism for automatically printing received messages, the improvement comprising: means to generate a signal having frequency and phase corresponding to frequency and phase of the primary input power, the means to generate having as an input the primary power; a phase lock loop to generate a frequency that varies according to variations that may occur in the frequency of the primary input power, the phase lock loop receiving as an input the signal from the means to generate; and means to temporarily store input data to the teleprinter, the means to temporarily store supplying the input data into the teleprinter in response to the frequency generated by the phase lock loop.

9. The improved teleprinter of claim 8 wherein the phase lock loop includes a phase comparator to compare phase of an output signal from the phase lock loop with the phase of the input signal into the phase lock loop and a voltage controlled oscillator to generate the output signal from the phase lock loop, the voltage controlled oscillator being controlled by the phase comparator output signal.

10. The improved teleprinter of claim 9 further including a frequency divider to reduce the frequency of the output signal from the voltage controlled oscillator to a value compatible with the teleprinter processing rate.

11. A method of varying the input data rate into a teleprinter operating at a speed as determined by the frequency of primary power into the teleprinter thereby minimizing printing errors due to power line frequency variations, comprising: shaping a signal that corresponds to the power line frequency in phase and frequency; generating a signal with a phase comparator that compares the signal that corresponds in phase and frequency to the power line frequency with a signal generated by a voltage controlled oscillator; controlling the output frequency of the voltage controlled oscillator with the signal generated with the phase comparator; and clocking data into the teleprinter at a rate derived from the output frequency of the voltage controlled oscillator thereby varying the input data rate into the teleprinter as a function of frequency of the primary power used to power the teleprinter.

12. The method of claim 11 further including modifying the output frequency of the voltage controlled oscillator to establish the rate of clocking data into the teleprinter.

13. A method of modifying the rate at which data is supplied to a teleprinter operating at a speed as determined by the frequency of primary power thereby minimizing printer errors due to power line frequency variations, comprising: preparing a portion of the primary power for use by a phase comparator to compare phase of the power line frequency with phase of a frequency generated by a voltage controlled oscillator; controlling the output frequency of the voltage controlled oscillator by the use of a signal generated by the phase comparator that is proportional to the phase difference of the two signals compared by the phase comparator; and controlling the rate at which input data is processed into the teleprinter by using the output frequency of the voltage controlled oscillator, thereby modifying the input data rate as a function of power line frequency.

14. The method of claim 13 further including changing the output frequency of the voltage controlled oscillator; and temporarily storing the input data until it is processed into the teleprinter at a rate controlled by the changed output frequency of the voltage controlled oscillator.

15. A method of reducing teleprinter printing errors due to speed variations of the teleprinter brought about by frequency variations of primary input power to the teleprinter, comprising: controlling the output frequency of a controlled frequency source as a function of the frequency of the primary input power; temporarily storing input data for the teleprinter in a temporary storage means; processing data into the teleprinter from the temporary storage means at a rate controlled by the output frequency of the controlled frequency source, thereby modifying the data input rate as a function of the frequency of the primary input power to minimize printing errors due to primary input power frequency variations.

16. A system for modifying the input data rate for data supplied to a teleprinter, as a function of the frequency of primary power to minimize teleprinter printing errors due to speed variations brought about by primary power frequency variations, comprising: a controlled frequency source having an output frequency; means for deriving from the primary power a control signal for varying the output frequency of the controlled frequency source as a function of variations of the primary power frequency; storage means to temporarily store input data; control means to clock data out of the storage means at a rate controlled by the output frequency of the phase lock loop; and status means to command an input of data from a data source into the storage means when data in the storage means has been locked out.

17. The system of claim 16 further having switch means to provide capability to operate with at least two different primary power frequencies.

* * * * *